Nov. 14, 1961
A. C. DUNN
3,008,824
METHOD OF FORGING POWDERED MATERIALS
Filed April 29, 1950
2 Sheets-Sheet 1
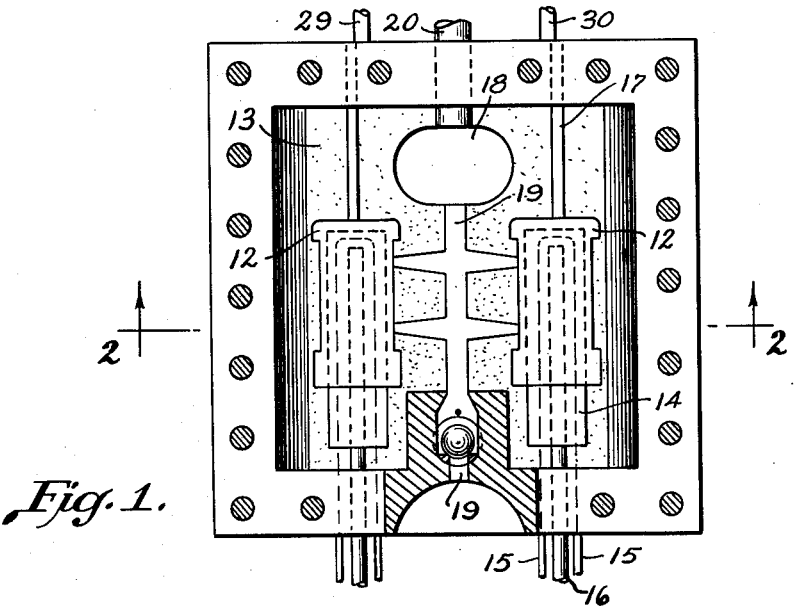
Fig. 1.
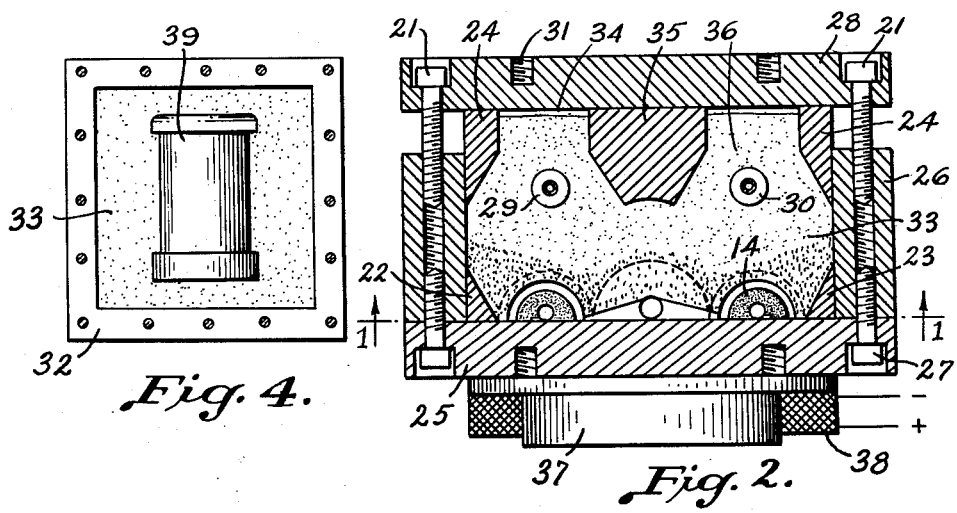
Fig. 4.
Fig. 2.
Inventor
ANDREW C. DUNN,
By
Attorney Nov. 14, 1961 A. C. DUNN 3,008,824
METHOD OF FORGING POWDERED MATERIALS
Filed April 29, 1950 2 Sheets-Sheet 2

Inventor
ANDREW C. DUNN,
By George Lynn de Matt
Attorney

United States Patent Office 3,008,824
Patented Nov. 14, 1961

3,008,824
METHOD OF FORGING POWDERED MATERIALS
Andrew C. Dunn, 3243 Pierce Ave., Chicago, Ill.
Filed Apr. 29, 1950, Ser. No. 159,113
1 Claim. (Cl. 75—226)

This invention relates to a method of and an apparatus for forging powdered materials to produce composite articles. More particularly the invention relates to a forging method in which powdered metals are compacted under high pressure and sintered to composite form while held under that pressure.

In the prior art the making of articles from powdered materials, such as metal, has been proposed but the products so produced have been characterized by their porosity and lack of strength after completion. Their production has also been limited to relatively small articles because of the difficulty of applying adequate compacting pressure to bodies of large areas of cross section. The present invention overcomes the prior art difficulties through the introduction of several novel steps tending to produce, by relatively simple apparatus, more complete compacting and compressing of the material, and to insure that the article will remain so compacted.

The objects of the invention are to provide a method and an apparatus for carrying it out, whereby powdered material may be compacted in a direction angularly related to that of the applied pressure, as well as coaxial therewith; to provide means wherein, in the making of a mold, the cooling rate can be regulated for the most efficient operation, and, furthermore, to provide for the incorporation of inserts which are embedded during the foregoing operation and do not have to be secured subsequently by extraneous means.

Another object is to provide a ready and facile means of utilizing a forging operation to combine a surface layer of material with a supporting body portion. Still another object is to provide a technique for causing the major axes of the powder particles to align themselves in a direction substantially parallel to the axis along which the forging pressure is applied. The process also contemplates a procedure whereby the material may be adequately compacted by application of relatively lighter pressure than heretofore, and yet the particles will remain compacted when the source of compacting pressure is removed or between successive applications of compacting pressure, and also to provide a material which not only assists the compacting during pressure application, but is also capable of polymerization or other action during a sintering operation to assist in the consolidation of the article being produced.

Another object is to provide means for internally heating the material in a mold while it is being sintered under presure, or during the performance of molding operations.

Another object is to provide means whereby a mold may be made to contain conducting tubes of high heat conducting capacity through which hot or cold liquid may be circulated to maintain the mold at the most effective working temperature.

Numerous other objects and advantages will be apparent from the following description when it is read in conjunction with the accompanying drawing in which:

FIGURE 1 is a horizontal sectional view through one form of mold embodying the invention, the section being taken on line 1—1 of FIGURE 2;

FIGURE 2 is a sectional view on line 2—2 of FIGURE 1, showing a mold section in the process of being made of powdered material, and disclosing means for aligning the mold particles before and as they are being compacted;

FIGURE 4 is a plan view of a forging or forming die produced according to the present invention;

Figure 3:
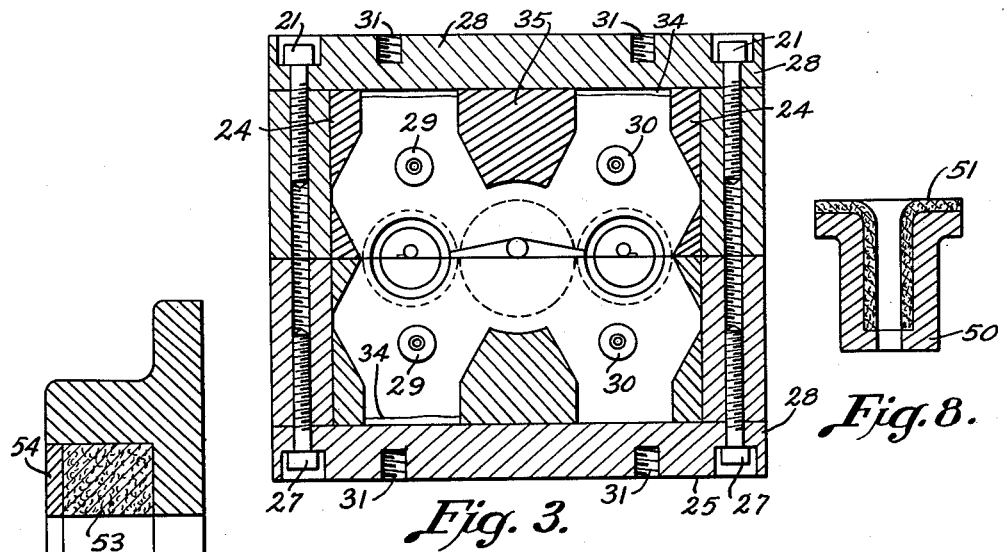
FIGURE 3 is a sectional view similar to FIGURE 2, but showing a complete closed mold, made up of two sections produced as in FIGURE 2.

The principal apparatus of this invention is illustrated as a portable container which comprises a box shaped receptacle made of any suitable material, composed of four side walls 26 and a bottom 25 to provide an upwardly facing container opening, as shown in FIG. 1, which is adapted to be filled with powdered material as indicated by the dots in FIGS. 1 and 2. The container is employed to shape the powdered material to the form of the article desired and consequently can be of proper shape for this purpose and may also contain other shaping instrumentalities as hereinafter explained.

The present illustrated use of the container is concerned with the making of a sintered powdered metal casting mold. As the critical shaping in this illustration is the forming of the internal casting mold cavities, the outside shape is immaterial and the container can take the form of a square box. Prior to filling the box, the necessary pattern forms will be placed therein for shaping the aforesaid cavities. In the use of the formed mold for the double casting of articles, the article patterns 12, 12, are suitably positioned in relation to the gate pattern 19 which includes the entrance sprue and pattern shapes for creating the metal directing and feed branches to the mold cavities. Pattern shape 18 for creating a metal reservoir, hereinafter referred to, and pattern shape 20 for application of pressure to said reservoir are also placed in the box. The entrance sprue can be performed or a suitable pattern can be used and placed as aforesaid to form the sprue of sintered powdered metal simultaneously with the formation of the mold. When the mold is to be utilized for casting a hollow article by the use of a core, suitable core prints 14 are employed with the aforesaid patterns. When the patterns are properly placed powdered metal is poured into the box to completely fill the spaces around the patterns and to fill the box. Before proceeding with the further procedures of my invention, it is considered expedient to explain the particular mold which is the illustrative subject of the instant method and apparatus.

Proceeding with the procedure for making this type of mold, the patterns are placed as above set forth. Other patterns may be used depending on the circumstances presented. Patterns 17 are provided for creating air vents to the article cavities. Suitable channel patterns are provided to provide openings to accommodate the pipes 15 and 16. Pipes 15 form a return conduit for applying a heating or cooling medium to the core, whereas pipe 16 supplys high pressure to the core to sustain it against the high casting pressure. This is particularly useful when a porous core is used as the fluid flows through the pores of the core and sustains the core against collapse.

If it is desired to control the temperature of the sintered mold, the container may be provided with a finned tube of good heat conductivity having an inlet and an outlet 29 and 30, respectively. This may be used for conducting a heating or cooling medium to the container to maintain the working temperature desired.

The container with the desired patterns positioned as stated above is now filled with powdered metal and the powder is packed around the patterns in as tight a condition as possible. FIG. 2 illustrates the filled container at this stage of the process, and demonstrates the facility with which casting molds of preferred characteristics can be made. Where a casting mold having differential cooling effects is desired as in my preferred casting method, the powdered material may be of types having different cooling rates. In this illustration, the large dots 33 surrounding the gate and material reservoir represent powdered metal of one conductivity and the remaining powdered metal, represented by the small dots 36, is of other conductivities. This creates progressive cooling.

The container now receives a top 28 which may be provided with a rim or telescopic sleeve 24 to close the container and trap the powdered metal. Suitable tie bolts or screws 21 are provided for holding the top to the container and for creating pressure in the container as will be described later. Although the plane of division of the top and bottom sections is illustrated in FIG. 2, it is understood that the container can be divided along any other plane as desired.

The assembled and closed container is now placed between the dies of an available forging hammer, press, or other pressure means to cause the top and bottom of the container to be forced toward each other under high pressure to subject the powder within the container to this pressure. If a hammer is used, thes crews are tightened during or after each stroke of the hammer to maintain the pressure on the powder, whereas if a press is used the screws are tightened under the final pressure of the press. The powder therefore is not only compacted under high pressure but the container maintains the powder under that pressure. The container with the powder under high pressure is placed in a furnace to sinter the powder. Sintering of the powder under high pressure produces preferred characteristics in the product.

Under certain circumstances, such as desired in the preferred packing of certain zones in accordance with particular article shapes, angle blocks 23 are provided to divert the axially applied pressure to pressures at an angle or at angles thereto. Also, the rim 24 may be beveled as is shown in FIG. 2 and further may be used with suitable angle blocks such as 35. These blocks may be angled and shaped in the manner to obtain the results desired. The function of these angle blocks is based on the known phenomena that powdered material, upon being pressed between two opposing plungers, will only be compacted in the zone between the plungers and that side movement of the powder does not react under high pressure, as distinguished from the action of solid metal and fluids when subjected to similar pressures. The pressure blocks are therefore utilized to create better side flow and therefore better side compacting characteristics as determined by the shape of the pattern and in accordance with other characteristics desired. In accordance with their shape and disposition, these blocks may produce equal high compactness on all surfaces of the pattern and, or, produce equal density throughout the mass of powder with one compression operation as well as provide localized pressure zones as desired. These operations are accomplished by disposing on the base plate 25 pressure blocks 22 and 23, and some powdered material, placing the tube 29—30, completing the filling of the container with powdered material 36 and then placing a central pressure block 35, and pressure band 24. The space within the band is then filled and the material within is compacted. The pressure blocks serve as a means of applying localized pressure depending upon the angularity of the faces of the blocks when the cover plate 28 is placed in position and exposed to high compacting pressure either by intermittent hammer blows, or by steady heavy pressure of a press. The screws 21 also serve to exert heavy pressure when the mold is filled and the cover secured in place. Obviously the angularity of the inclined faces of blocks 22, 23 and 25, and of the face of band 24, will determine the direction of pressure application with respect to the axial movement of cover plate 28. By progressive tightening of screws 21 as the cover 28 is subjected to pressure, the compacted condition of the powder from outside pressure is maintained and supplemented by the screw-press action of the cover.

As stated above, the container with the powdered metal contained therein and surrounding the patterns under high compression is placed in any suitable furnace for sintering the powder. The instant method and the utilization of the container as above described provides a simple and convenient method of producing metal articles and one that uses inexpensive and readily procurable apparatus and materials. The only special apparatus required is the container and the several blocks described and these can be quickly procured or fabricated from plate or cast material as is readily apparent. This expediency is in marked distinction to the usual powdered metallurgical apparatus which requires specially constructed presses that usually have the powder cavities built therein or in the form of solid steel dies attached thereto. In view of the described use of the container of the instant invention, the instant procedure can utilize the pressure of any available press, hammer, or other pressure medium, and the heat of any type of furnace or other heating medium for carrying out the sintering operation under pressure. Pressure can also be developed by the container locking means such as the disclosed screws 21. Under these circumstances, large molds or other large articles can be made of sintered powder since it is a simple matter to construct a container of such size as distinguished from the expense and effort required in constructing a large press with a built in cavity or the use of steel dies of such size. When various shaped and sized articles are to be manufactured, it is not necessary to change the specially built press of the usual operation for only a new container needs to be fabricated.

Therefore, the method of sintering powdered metal with the use of a container as outlined creates a rapid manufacturing process which is both simple and inexpensive. The construction of special hammers or presses with built in cavities for each article shape is rendered unnecessary. The instant container can be quickly made and placed under pressure with any type of pressure medium available and then removed therefrom and placed in an ordinary furnace for sintering. The operations of filling the container, compacting the powder, heating the container and powder, and removing the sintered article are performed independently of each other and therefor do not waste the operating time of the apparatus involved. Special equipment and machinery is not needed. It is also apparent that the number of presses or hammers may be regulated to the capacity of the furnace.

When it is desired to produce a sintered article or mold having maximum density and forging characteristics, the operation contemplates additional novel features of chilling and magnetic alignment. In the magnetic alignment operation, the baseplate 25 or bottom of the container has secured thereto, a metal block 37 carrying a winding 38 to which direct current may be supplied from any suitable source. The effect of this current is to magnetize the block 37 and the base plate, so as to attract the metal particles 36 and to align them in a vertical direction substantially parallel to the axial stress applied by the cover 28. Inasmuch as the particles are deposited in the mold cavity in various relations this alignment materially facilitates the compacting operation, and it is desirable that the powder 36 be tamped before the closure is applied and tightened, so as to bring the mold material to a preliminary compacted condition.

Experience has demonstrated the desirability of thoroughly mixing the powdered mold material with a liquid, and chilling it before it is placed in the container. Although various liquids may be used for dampening the powder, it is preferred to use a polymerizable oil. This oil not only assists in placing the powder in a tamping condition, but it also, when subjected to sintering temperatures, polymerizes and assists in binding the sintered powder into a hard compact abrasive resistant mass. The polymerization products assume a hardness approximating that of the metal particles being sintered. Whereas a normal sintering operation results in binding action where adjacent particles have contacts over limited areas only, the polymerization products extend that contact over substantially greater areas, and tend to fill the voids between the particles making a more dense and a stronger product.

In FIGURE 3 the complete closed mold, made up of two completed sections of sintered powder is disposed in a container having top and bottom halves, each of which corresponds to the container shown in FIGURE 2.

It will be understood that after two mold sections have been sintered, as in FIGURE 2, the base plates 25 are removed and the two units assembled as in FIGURE 3. The mold may be operated either by hand or by power, and the plates 28 are provided with threaded recesses 31 for mounting and aligning purposes. The mold, when closed, may then be charged with molten metal in any suitable manner, and subjected to pressure as described in connection with FIGURE 1.

In the various methods disclosed above for making molds, an important feature of the instant invention is the facility with which the mold cavity can be made. In prior practices, the mold cavity is usually formed to finished shape by the tedious and expensive die sinking operation performed by experts in this art. In the instant method, it is only necessary to form patterns of the article shapes, which patterns automatically shape the cavity to final form in accordance with this method. Due to the close tolerances produced by this method, necessary machinery is materially reduced. Experience of a die sinker is not required. The patterns can be made by any pattern maker or tool maker. Essentially, the operation is to make a split pattern of the article to be cast. The salient fact is that the pattern constitutes an external shape which is much easier machined than is the internal shape required in conventional mold making. The patterns should be made of high compressible material either metallic or non-metallic.

The invention has been so far described as applied to the art of mold making, but it is equally applicable to die making. FIG. 4, for example, shows a forming or forging die made according to the invention. It comprises a container 32 having a compacted sintered filler body 33 having a die cavity 39. This type of die does not require heat controlling means such as are previously described, hence no such means is illustrated.

Figure 6:
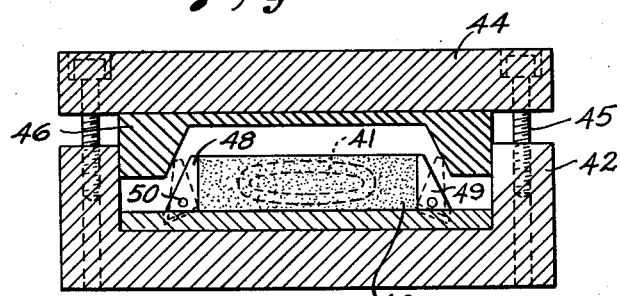
FIGURE 6 is a section on line 6—6 of FIGURE 5, but showing both the top and bottom of the forging die, and with the die in partially opened position.

It is to be understood that the present invention embodies not only the novel feature of providing composite articles, made up of powdered material sintered to composite form, but it also makes it possible to combine the sintered portion with a metal portion into a composite structure. One such application of the invention, with the apparatus for producing it, is illustrated in FIGURES 5, 6 and 7.

Figures 5, 7, 9:
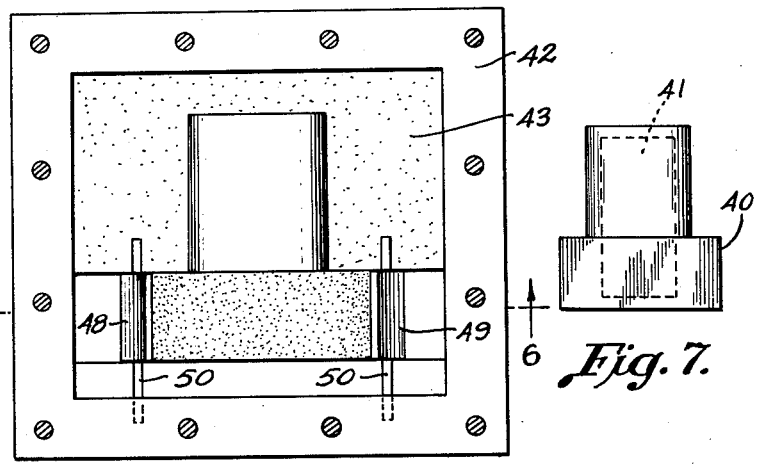
FIGURE 5 is a sectional view showing an open forging die with a forged article disposed therein.
FIGURE 7 is a side elevation of one form of article forged by the apparatus of FIGURE 6.
FIGURE 9 is a sectional view of a blanking die also made according to the present invention.

The article shown in FIGURE 7 comprises a sintered body portion 40, having a metal insert 41. It will be seen that this composite structure combines the properties of a heat and abrasion resistant exterior, with a strengthening protected interior portion. Such an article may be made according to the present invention, utilizing the procedure illustrated in FIGURES 5 and 6.

In FIGURE 5, 42 represents a container section holding a powdered sintered mold 43 made as set forth in connection with FIGURE 2. The mold contains a cavity of a size and shape to receive the article 40, with its insert 41, which is to be formed in the mold. FIGURE 5 shows the mold container with the cover removed and the article in position subsequent to the molding operation, whereas FIGURE 6 shows a section of the mold and article after the article has been produced and the cover partially removed. The container shown more clearly in FIGURE 6, comprises not only the bottom section 42, but a top section 44 adapted to cooperate with the bottom section to form a closed container in which the powdered material can be compacted and sintered. The top section can be secured to the bottom section by bolts 45 to compress the powdered material as set forth above. As in FIGURE 2, the cover engages a pressure block 46 adapted to project into the cavity in the bottom section 42 and to apply localized pressure in directions and at points desired. The bottom section, contains levers 48 and 49 pivoted on pins 50 carried by the bottom section. These levers serve to compress the powdered material 40 laterally, and at right angles to the direction of movement of top section 44, when it is being closed, and when the angular portions of block 45 strike the levers. The insert 41 will, of course, be placed at the proper time in filling the section 42 with powdered material. The container is closed and subjected to pressure and to sintering temperature, in the same manner as that set forth in connection with FIGURE 2. Of course the tamping and aligning technique of FIGURE 2 may be followed whenever desired. When the mold is made up of metals such as iron, tungsten and the like any binders known in the art are included in the powdered metal mixture.

Figure 8:
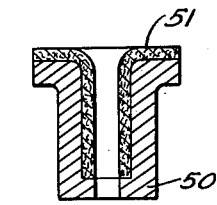
FIGURE 8 is a sectional view of a forming or extruding die having an abrasive facing produced in accordance with the present invention.

FIGURE 8 shows a drawing or extruding die having a metal body portion 50, and a compacted sintered basic facing 51, made by the process of compacting and sintering according to the present invention.

FIGURE 9 is a view of still another product made according to the invention. It comprises a blanking die shoe made up of a metal body 52, having a cavity filled with sintered powdered metal 53 to which is attached a metal cutting edge 54. The portion 54 may be placed in a mold and formed in position, along with the portion 53, during the compacting and sintering operation.

In the above description it has been indicated that the pressure blocks associated with the mold covers 28 and 44 are separate members. It is to be understood, however that when a pressure block is used as indicated in FIG. 6 it may comprise an integral projection on the cover and may telescope within the mold container walls.

It will be clear from the foregoing specification that my invention provides several important advantages over the prior art, which may be epitomized as follows:

(1) Patterns are compressed and sintered to exact dimensions within the mold, hence the cavities are extremely accurate in all their dimensions.

(2) Patterns can be made accurately but with far less expense than heretofore since they are made of metal or ceramics, can be readily duplicated, and can be worked on entirely from the outside, thus avoiding present difficulties of internal working or die-sinking.

(3) Mold surfaces can be readily and inexpensively placed to provide long-wearing abrasive areas.

(4) Molds can be given desired localized heat-flow properties by filling predetermined portions with materials having predetermined heat-flow characteristics.

(5) Chilling of the powdered material before it is placed in the mold assists in producing articles of great density and compactness with no added effort.

(6) The use of internal heating during sintering creates added internal forging pressure.

(7) Magnetic aligning of particles during mold filling simplifies and accentuates compacting, especially when combined with liquid tamping, to produce finished articles closely approximating a forged casting in physical properties.

While only a few forms of product made according to the present invention have been shown and described, it will be obvious that various changes and modifications may be made in the details, within the scope of the appended claim, without departing from the spirit and scope of the invention.

Having thus described the invention, what is claimed is:

The method of making an integrated article by powder metallurgy approximating the characteristics of a forged article, comprising the steps of filling a portable contractible container with powdered material, subjecting the container to pressure contracting the same and placing the powdered material under pressure, securing the container in contracted condition, removing the container from the pressure applying medium without relieving the pressure on the powdered material, placing the container and material in a furnace, and subjecting the powdered material to a sintering temperature whereby the powder is integrated under pressure.

References Cited in the file of this patent

OTHER REFERENCES

| | | |
|---|---|---|
| 356,872 | Gallas | Feb. 1, 1887 |
| 450,521 | Mistelski | Apr. 14, 1891 |
| 1,091,430 | Gladitz | Mar. 24, 1914 |
| 1,326,614 | Pfanstiehl | Dec. 30, 1919 |
| 2,048,222 | Rehmann | July 21, 1936 |
| 2,101,404 | Mahle | Dec. 7, 1937 |
| 2,149,596 | Gillett et al. | Mar. 7, 1939 |
| 2,188,091 | Baermann | Jan. 23, 1940 |
| 2,191,687 | Skates | Feb. 27, 1940 |
| 2,213,523 | Jones | Sept. 3, 1940 |
| 2,232,126 | McWane | Feb. 18, 1941 |
| 2,241,095 | Marvin | May 6, 1941 |
| 2,252,697 | Brassert | Aug. 19, 1941 |
| 2,293,400 | Morris et al. | Aug. 18, 1942 |
| 2,298,885 | Hull | Oct. 13, 1942 |
| 2,331,909 | Hensel et al. | Oct. 19, 1943 |
| 2,363,337 | Kelly | Nov. 21, 1944 |
| 2,363,575 | De Lamatter et al. | Nov. 28, 1944 |
| 2,365,083 | Jarrett | Dec. 12, 1944 |
| 2,372,605 | Ross | Mar. 27, 1945 |
| 2,372,607 | Schwarzkopf | Mar. 27, 1945 |
| 2,377,191 | Teachout | May 29, 1945 |
| 2,384,215 | Toulmin | Sept. 4, 1945 |
| 2,386,604 | Goetzel | Oct. 9, 1945 |
| 2,431,095 | Tucker | Nov. 18, 1947 |
| 2,455,804 | Ransley et al. | Dec. 7, 1948 |
| 2,479,364 | Jocelyn | Aug. 16, 1949 |
| 2,492,131 | Burger et al. | Dec. 27, 1949 |

FOREIGN PATENTS

| | | |
|---|---|---|
| 626,983 | Great Britain | July 25, 1949 |

OTHER REFERENCES

Dietert: Modern Core Practices and Theories, published by American Foundrymen Association, Chicago, Ill., 1942, pages 238–244.